US006873727B2

United States Patent
Lopez et al.

(10) Patent No.: US 6,873,727 B2
(45) Date of Patent: Mar. 29, 2005

(54) SYSTEM FOR SETTING IMAGE CHARACTERISTICS USING EMBEDDED CAMERA TAG INFORMATION

(75) Inventors: Patricia D. Lopez, Loveland, CO (US); Robert E. Sobol, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 648 days.

(21) Appl. No.: 09/911,280

(22) Filed: Jul. 23, 2001

(65) Prior Publication Data

US 2003/0016865 A1 Jan. 23, 2003

(51) Int. Cl.$^7$ .......................... G06K 9/00; H04N 1/419
(52) U.S. Cl. ...................................... 382/162; 358/3.23
(58) Field of Search ................................ 382/162, 165, 382/167, 274, 305, 306, 307; 358/1.9, 3.23, 509, 444, 474, 518, 520, 523, 9.6; 348/223, 655

(56) References Cited

U.S. PATENT DOCUMENTS

| | | | | |
|---|---|---|---|---|
| 5,495,428 A | * | 2/1996 | Schwartz | 382/164 |
| 5,694,495 A | * | 12/1997 | Hara et al. | 382/324 |
| 6,038,339 A | | 3/2000 | Hubel et al. | 382/162 |
| 6,236,474 B1 | * | 5/2001 | Mestha et al. | 358/520 |
| 6,466,334 B1 | * | 10/2002 | Komiya et al. | 358/1.9 |
| 6,477,269 B1 | * | 11/2002 | Brechner | 382/165 |
| 6,515,275 B1 | * | 2/2003 | Hubel et al. | 250/226 |

* cited by examiner

Primary Examiner—Andrew W. Johns
Assistant Examiner—Amir Alavi

(57) ABSTRACT

A digital imaging system includes a color appearance handling capability that utilizes a database including actual image data and information relating to the actual image data to control illumination and color in digital images. The digital imaging system controls illumination and color with a color-by-correlation technology that includes an illuminant detection training algorithm that bases control of illumination and color on a database storing actual illuminants, scenes, and subjects from representative image acquisition devices such as digital cameras and scanners. In one example, illuminant detection training is accurately rendered for a variety of illuminants, scenes, and subjects that are expected to be of interest to users of a particular camera or group of cameras. In the example, the database is formed by user-group submissions from users of a particular camera or group of cameras. The digital imaging system accesses a database capable of supplying actual image data including illuminants, chromaticities, colors, and the like. The database also stores information relating to the actual image data including tags that identify the image acquisition device that acquires a particular image, and information relating to manufacturer, model and version of the image acquisition device, and image acquisition devices settings at the time of acquisition.

21 Claims, 6 Drawing Sheets

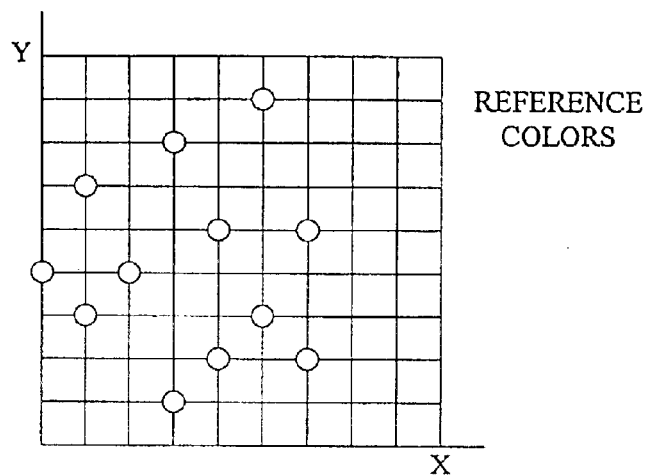
REFERENCE COLORS
FIG. 3
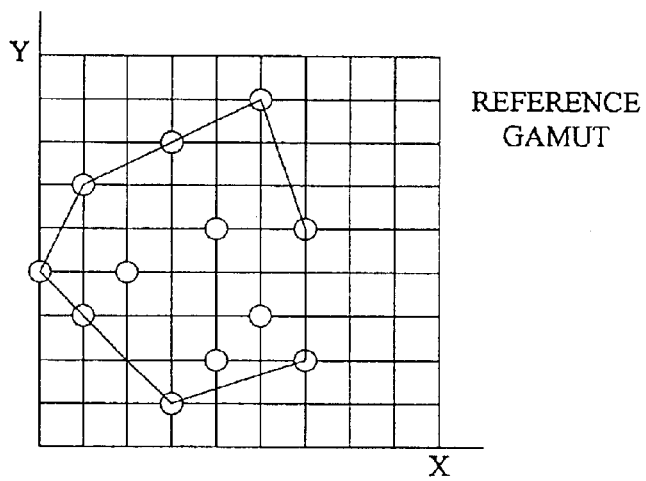
REFERENCE GAMUT
CORRELATION MATRIX 300
|      | ill1 | ill2 | ill3 | ill4 | ill5 | ill6 | ill7 | ill8 | ill9 | ill10 | ill11 | ill12 |
|------|------|------|------|------|------|------|------|------|------|-------|-------|-------|
| X1Y1 | 0 | 0 | 0 | 1 | 1 | 0 | 0 | 1 | 0 | 0 | 0 | 1 |
| X1Y2 | 0 | 0 | 1 | 0 | 0 | 1 | 0 | 1 | 0 | 0 | 1 | 0 |
| X1Y3 | 0 | 0 | 0 | 0 | 1 | 0 | 0 | 1 | 0 | 0 | 0 | 0 |
| .    | 1 | 0 | 0 | 1 | 0 | 0 | 0 | 1 | 1 | 0 | 0 | 1 |
| .    | 0 | 0 | 1 | 0 | 1 | 0 | 0 | 0 | 0 | 0 | 1 | 0 |
| X1YN | 0 | 0 | 0 | 1 | 0 | 0 | 0 | 1 | 0 | 0 | 0 | 1 |
| X2Y1 | 1 | 1 | 0 | 0 | 1 | 0 | 1 | 0 | 1 | 1 | 0 | 0 |
| X2Y2 | 0 | 0 | 0 | 1 | 0 | 0 | 0 | 1 | 0 | 0 | 0 | 1 |
| X2Y3 | 1 | 1 | 1 | 0 | 0 | 1 | 1 | 0 | 1 | 1 | 1 | 0 |
| .    | 0 | 0 | 0 | 0 | 1 | 1 | 0 | 0 | 0 | 0 | 0 | 0 |
| .    | 1 | 1 | 0 | 0 | 1 | 0 | 1 | 0 | 1 | 1 | 0 | 0 |
| X2YN | 0 | 1 | 1 | 1 | 0 | 1 | 1 | 0 | 0 | 1 | 1 | 1 |
| X3Y1 | 0 | 0 | 0 | 1 | 1 | 1 | 0 | 1 | 0 | 0 | 0 | 1 |
| .    | 1 | 0 | 0 | 0 | 1 | 0 | 0 | 1 | 1 | 0 | 0 | 0 |
| .    | 1 | 1 | 1 | 0 | 0 | 1 | 1 | 0 | 1 | 1 | 1 | 0 |
| .    | 0 | 0 | 0 | 1 | 1 | 0 | 0 | 0 | 0 | 0 | 0 | 1 |
| XNYN | 0 | 0 | 0 | 0 | 0 | 1 | 0 | 0 | 0 | 0 | 0 | 0 |

SYSTEM FOR SETTING IMAGE CHARACTERISTICS USING EMBEDDED CAMERA TAG INFORMATION

BACKGROUND OF THE INVENTION

The human psychovisual system is highly capable of appropriately adapting to illumination characteristics of an image. A human observer detects a particular range of colors for a large variety of scene illuminants. For example, the human viewer accurately perceives color of an object independent of the color of light illuminating the scene. In contrast, color digital systems such as digital cameras, frequently infer the color of the scene illuminant incorrectly.

Color appearance models can be used to model the manner the human visual system perceives the color of an object under different lighting conditions and with different backgrounds. The model is typically used so that an image viewed under one lighting condition can be adjusted to appear to have the same colors viewed under a different lighting condition.

Color appearance models are intended to attain a capability to store images in a device-independent manner. For example, a computer of an imaging system can acquire an image and a color appearance model, utilizing illumination conditions relating to the image, can transform the image into an internal representation. When the image is subsequently displayed on a display screen or printer, the color appearance can be reconstructed from the internal representation based on information relating to the output display illumination conditions to transform the internal representation to the correct representation for output display.

Color appearance models can be used to direct image processing operations to supply accurate and appropriate color reproduction, but only in a system with a suitable level of color constancy. Several color appearance models have been proposed that suitably compensate for a range of illuminants. However, these models cannot be used in digital photography and other applications since the color of the scene illumination must be known a priori. Typically this information is unavailable.

A digital camera must compensate for illuminants either by measuring the color of the scene illumination or estimate the illuminator color from the image data. In a digital imaging system, usage of an illumination sensor is impractical.

One of the problems with color appearance models is that the models are typically based on standard color or spectral definitions, such as Munsell color chips, that do not suitably cover the gamut of color and illuminants for a particular application. For example, the colors and image characteristics of digital cameras can be very different from characteristics in other areas.

SUMMARY OF THE INVENTION

What is needed is a technique for achieving color constancy from the image data alone. What is further needed is a technique and system that utilize a database that stores actual image data and information relating to the image data to base an illuminant detection-training algorithm.

In accordance with aspects of the present invention, a digital imaging system includes a color appearance handling capability that utilizes a database including actual image data and information relating to the actual image data to control illumination and color in digital images.

In one embodiment, the digital imaging system controls illumination and color with a color-by-correlation technology that includes an illuminant detection training algorithm that bases control of illumination and color on a database storing actual illuminants, scenes, and subjects from representative image acquisition devices such as digital cameras and scanners. In one example, illuminant detection training is accurately rendered for a variety of illuminants, scenes, and subjects that are expected to be of interest to users of a particular camera or group of cameras. In the example, the database is formed by user-group submissions from users of a particular camera or group of cameras. The digital imaging system accesses a database capable of supplying actual image data including illuminants, chromaticities, colors, and the like. The database also stores information relating to the actual image data including tags that identify the image acquisition device that acquires a particular image, and information concerning manufacturer, model and version of the image acquisition device, and image acquisition devices settings at the time of acquisition.

In accordance with another aspect of the present invention, a digital imaging system accesses a database capable of supplying actual image data including illuminants, chromaticities, colors, and the like. The database further includes information relating to the actual image data including tags that identify the image acquisition device that acquires a particular image, and information concerning the manufacturer, model and version of the image acquisition device, and image acquisition devices settings at the time of acquisition. The digital imaging system uses the information for design and improvement of image acquisition devices such as digital cameras and scanners. The database includes tags such as manufacturer and model tags to screen the digital images stored in the database according to manufacturer and model. The database also stores additional private image tag information including manufacturer and model information tags, and image data tags including focal length, shutter speed, aperture, and the like. The image acquisition device generates tags to derive additional information when images created by the devices are acquired and stored in the database.

BRIEF DESCRIPTION OF THE DRAWINGS

The features of the described embodiments believed to be novel are specifically set forth in the appended claims. However, embodiments of the invention relating to both structure and method of operation, may best be understood by referring to the following description and accompanying drawings.

FIG. 3 is a correlation matrix that is configured to correlate data from any picture image to reference images under a range of illuminants.

DESCRIPTION OF THE EMBODIMENT(S)

Figure 1:
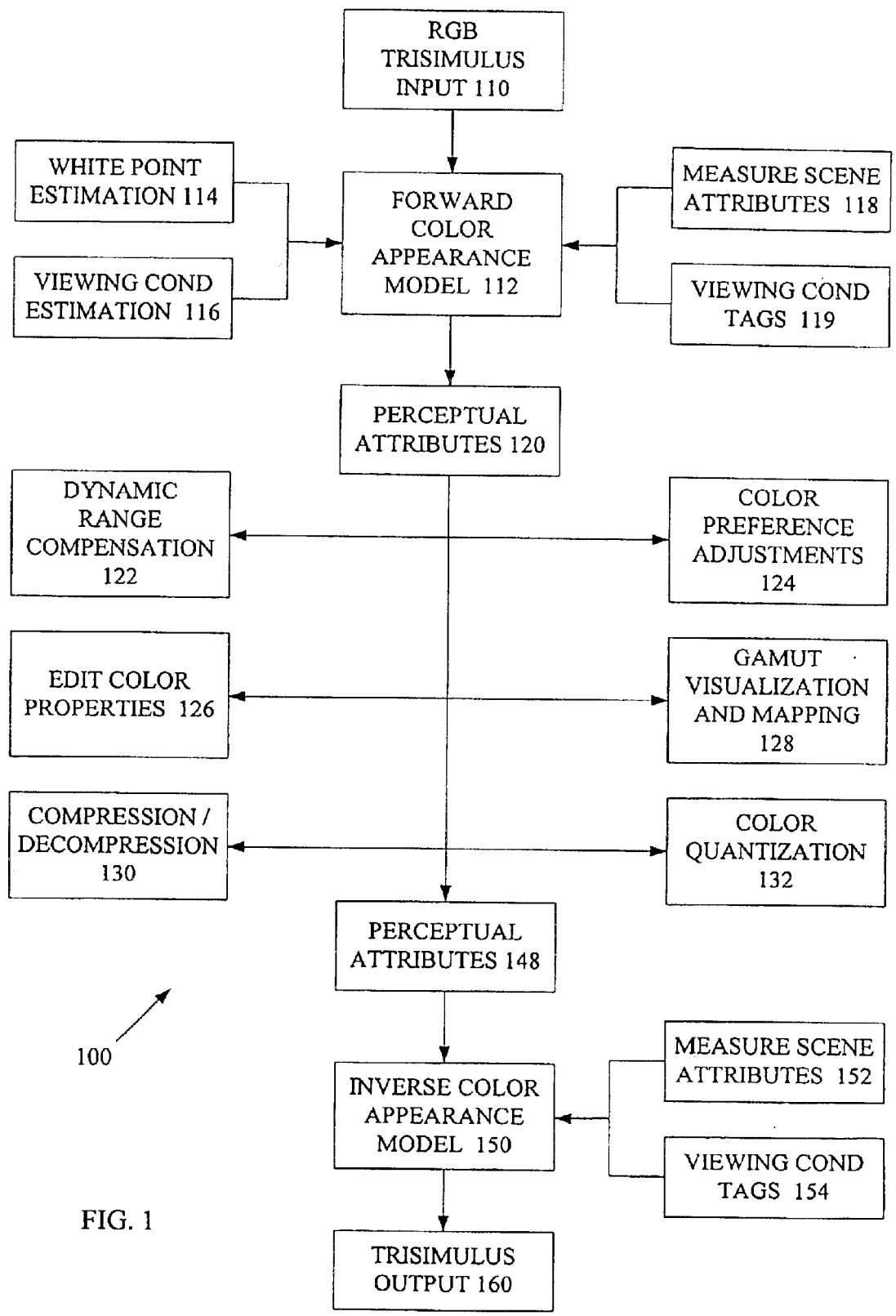
FIG. 1 is a schematic flowchart illustrating a color appearance model in accordance with an aspect of the present invention.

Referring to FIG. 1, a schematic flowchart illustrating a color appearance model 100 that can be used to convert from RBG tristimulus values to attributes perceptible to the human psychovisual system. Similarly, the perceptual attributes can be converted back to tristimulus values. The digital imaging system 100 can control processing and display of image data to account for both the input and output viewing conditions to store and display color characteristics independent of device and viewing condition. Flexible color handling enables a range of algorithms and processing for overall color processing. RGB tristimulus input values 110 are applied to the color appearance model 100 and converted to perceptual attributes 120 using a forward color appearance model 112, and transformed back to tristimulus output values 160 using an inverse color appearance model 150.

The forward color appearance model 112 includes operations of white point estimation 114 and viewing condition estimation 116 using stored image data and information including scene attributes 118 and viewing condition tags 119.

In an illustrative embodiment, the forward color appearance model 112 and inverse color appearance model 150 include a color appearance handling capability that utilizes a database of scene attributes 118 and viewing condition tags 119 including actual image data. The database further stores information relating to the actual image data to control illumination and color in digital images.

The perceptual attributes 120 can be modified into processed perceptual attributes 148 using various techniques including color and processing algorithms that operate on the perceptual attributes 120. The various processing techniques applied to uniform color spaces or perceptual attributes 120 include dynamic range compensation 122, color preference adjustments 124, editing of color properties 126, gamut visualization and mapping 128, compression and decompression 130, color quantization 132, and other operations.

The inverse color appearance model 150 processes the perceptual attributes using stored information and image data including scene attributes 152 and viewing condition tags 154.

Input and output viewing conditions can be set using various techniques. In some applications, viewing conditions are estimated by direct measurement, typically for hardcopy or softcopy viewing. Alternatively, correlation techniques or psychophysic operations can be used to determine viewing conditions. In other systems, viewing condition tags can be used to select from a set of standard viewing conditions.

In one embodiment, the forward color appearance model 112 and inverse color appearance model 150 control illumination and color with a color-by-correlation technology. The color-by-correlation method includes an illuminant detection training algorithm that bases control of illumination and color on a database including scene attributes 118 and viewing condition tags 119 that stores actual illuminants, scenes, and subjects from representative image acquisition devices such as digital cameras and scanners. In one example, illuminant detection training is accurately rendered for a variety of illuminants, scenes, and subjects that are expected to be of interest to users of a particular camera or group of cameras. Illuminant detection training classifies lighting according to an illuminant type such as day lighting, night lighting, halogen lighting, fluorescent lighting, and other classifications plus combinations of classifications, and modifies processing of images based on the classified illuminant.

In the example, the scene attributes 118 and viewing condition tags 119 database is formed by user-group submissions from users of a particular camera or group of cameras. The digital imaging system accesses a database capable of supplying actual image data including illuminants, chromaticities, colors, and the like. The scene attributes 118 and viewing condition tags 119 database also stores information relating to the actual image data including tags that identify the image acquisition device that acquires a particular image, and information concerning the manufacturer, model and version of the image acquisition device, and image acquisition devices settings at the time of acquisition. The database may be a particular photography or image database or a variety of photography collections such as photo websites.

Figure 2:
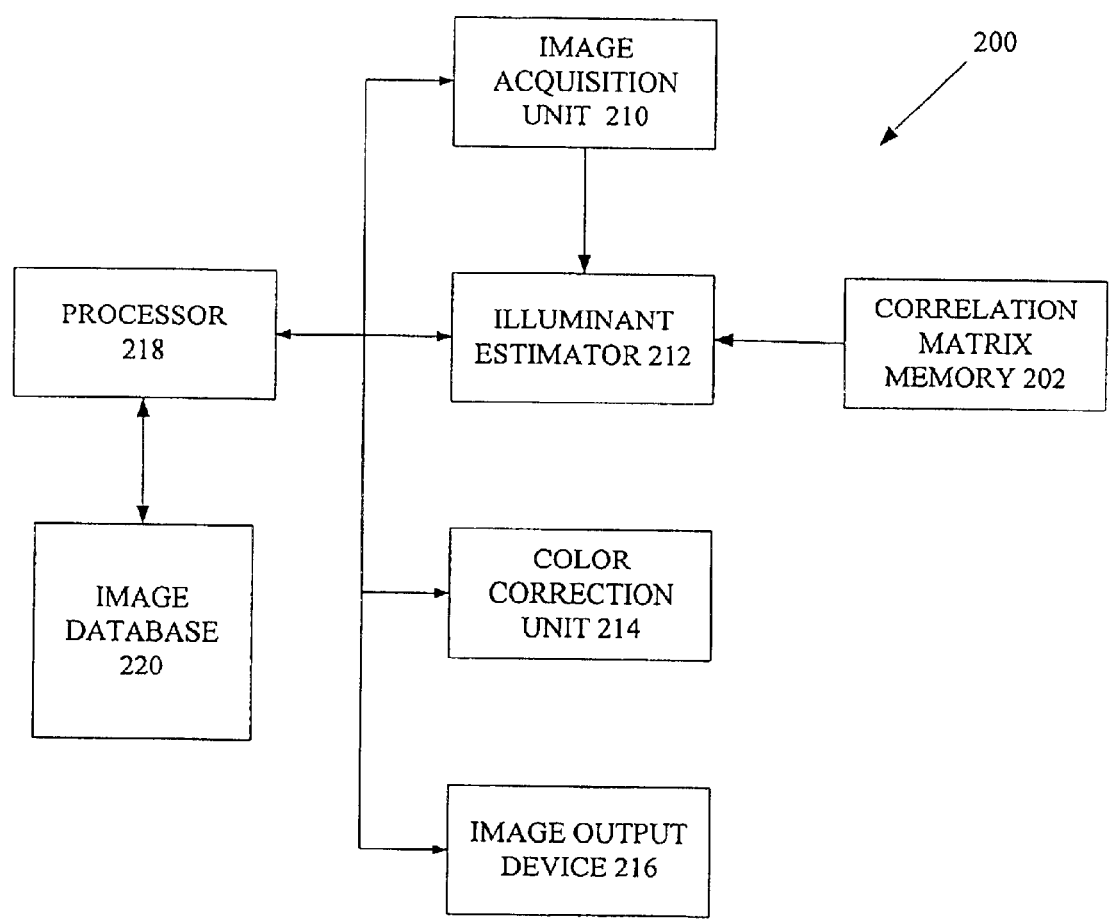
FIG. 2 is a schematic block diagram that shows a digital imaging system with a correlation matrix memory for illuminant estimation.

Referring to FIG. 2, a schematic block diagram shows a digital imaging system 200 with a correlation matrix memory 202 for illuminant estimation. The digital imaging system 200 includes an image acquisition unit 210 that is capable of acquiring an image for subsequent processing and storage, an illuminant estimator 212, a color correction unit 214, and an image output device 216. The image acquisition unit 210 is typically a scanner or a digital camera, either a still-image camera or a video camera, but in other embodiments broadly includes any other systems for acquiring or capturing images such as computer image generators, and the like. For example, an acquired image can be a computer-generated image formed using one or more computer-simulated light sources.

The illuminant estimator 212 receives acquired images from the image acquisition unit 210 and processes the images to estimate the number and type of illuminants associated with the acquired image. Illumination characteristics of images are highly variable and a priori unknown to the digital imaging system 200.

The illuminant estimator 212 estimates illuminant characteristics including number and type, and passes a description of the illuminant characteristics and the acquired image to a color correction unit 214. The color correction unit 214 processes the acquired image using information in the illumination characteristics to correct the color of the acquired image to produce a corrected image. The color correction unit 214 supplies the corrected image to the image output device 216 for display, printing, storage, transmission, or the like.

In various examples, the digital imaging system 200 can have various configurations such as a single, integrated unit or a composite system formed from discrete components, either independent or in combination.

The digital imaging system 200 further includes a processor 218 that is capable of executing operations in conjunction with the image acquisition unit 210, the illuminant estimator 212, and the color correction unit 214 to acquire, analyze, and correct image data. The processor 218 is typically a programmable device such as a microprocessor, computer, or digital signal processor, but may otherwise be a computational unit implemented in a programmable logic array, microcontroller, or the like. Although FIG. 2 shows processor 218 as being internal to the digital imaging system 200, in various examples the processor 218 can be internal or external with respect to the digital imaging system 200. In one example, the processor 218 can be a host computer that is external to other components of the digital imaging system 200.

Components of the digital imaging system 200 are described in terms of the functions performed rather than as a particular structural form. Any structures capable of performing the described functions as known by those having ordinary skill in the art may be used to perform the functions. Typically, the described functions can be performed according to control of a processor of any type. For example, the illuminant estimator 212 may be a microprocessor, an application specific integrated circuit (ASIC), a discrete circuit, a state machine, or any other circuit or component that is known in the art by one of ordinary skill in the art and capable of performing the described functions.

The digital imaging system 200 analyzes the acquired image to determine digital adjustments to the image that can be made by the color correction unit 214 to correct for characteristics of the light source used to illuminate the image. The digital imaging system 200 performs mathematical manipulation of image data using a technique for attaining color constancy called "color by correlation" to solve for a white-point in images. The color-by-correlation technique improves color digital imaging quality by quickly, accurately, and robustly estimating illuminant information associated with a color digital image by correcting image color based on the illuminant. The color-by-correlation technique exploits the correlation that exists between image colors and scene illuminants. For example, the most red camera measurement can only occur under red light having the highest proportion of red wavelength. Accordingly, the camera measurement with the highest red reading correlates strongly with the most red light. All camera measurements correlate to a greater or lesser degree with different light colors. The illuminant estimator 212 measures the correlation between all image colors and all lights to form a very accurate estimate of the color of the scene illuminant.

The color-by-correlation technique is insensitive to aperture colors and, for images with few illuminant colors, permits estimation such as determination of a maximum likelihood estimator.

The illuminant estimator 212 uses the correlation matrix memory 202, which may also be termed an "associative matrix memory," to correlate image colors and lights using Bayesian statistical analysis. The illuminant estimator 212 builds the correlation matrix memory 202 to correlate data from any image to the set of possible scene illuminants. The illuminant estimator 212 builds the correlation matrix memory 202 by first forming a set of reference surfaces that are illuminated by a particular source. The set of reference surfaces are plotted in chromaticity space. The illuminant estimator 212 then takes a convex hull of the chromaticities of the reference surfaces. The illuminant estimator 212 then rearranges the chromaticities to obtain reference ranges for particular source illuminant. For example, the matrix may be configured so that the presence of a chromaticity in a reference range is designated a "1" and the absence of a chromaticity in a range is designated as a "0" entry.

Columns of the matrix are a rearrangement of a two-dimensional chromaticity space into a list of binary points. For a particular color formed under a particular illuminant, a point called a chromaticity coordinate is set to "1" if and only if that color can occur under that illuminant. For example, the reddest chromaticity can only occur under the reddest illumination. Rows of the matrix correspond to a list of all plausible illuminants detected by a device.

The digital imaging system 200 computes data for the matrix using a set of reference surface colors, for example a color chart or a set of standard surfaces. According to one illustrative technique, one or more databases 220 of real-world images are used to accurately render for a variety of illuminants, scenes, and subjects. The various real-world images can be tagged according to information relating to specific imaging devices such as particular digital camera models or even a particular digital camera. Tags in the database 220 contain various types of information. The system renders the images more accurately by exploiting the information contained in the tags.

For each illuminant, the digital imaging system 200 computes chromaticities of the reference set for the column corresponding to the illuminant, first by multiplying the illuminant by reflectances stored for the reference surface, second by calculating chromaticities as detected by the image acquisition unit 210. The chromaticities correspond to the reference colors under the illuminant.

The reference range for the particular illuminant is a polygon derived from taking the convex hull of the points. In the column corresponding to the particular illuminant, the digital imaging system 200 activates the chromaticities of the points within the reference range to a "1" value, and deactivates other points to a "0" value.

Referring to FIG. 3, a correlation matrix 300 is configured to correlate data from any picture image to reference images under a range of illuminants. Columns, the vertical dimension of the matrix memory, are rearrangements of the two dimensional chromaticity space into a raster list of points. The correlation matrix 300 has a first column that corresponds to a shaded polygon, which contains the chromaticities of the reference range under illuminant 1. The digital imaging system 200 repeats the procedure for each column corresponding to all illuminants. The number of illuminants can be limited to attain only a desired result precision. The illuminant may be selected from among a group of sources. In an illustrative embodiment, the illuminant may be selected from among sources that correspond to the particular model of image acquisition unit 210.

Rows of the correlation matrix 300 correspond to a raster list of chromaticities for all possible luminants as detected by the device. The illustrative system facilitates computation of data for the correlation matrix by utilizing a set of reference surface colors such as a color chart or standard surface set. For each illuminant and associated column, the system computes chromaticities of the reference set. The system multiplies the illuminant by the reference surface reflectances and calculates the chromaticities detected by the imaging device. In the column corresponding to the particular illuminant, the chromaticities of the points within the reference range are activated by assigning a value "1" in the matrix entry. Other entries are set to value "0". The system repeats the procedure for each column corresponding to all illuminants.

The results of generating the correlation matrix memory 202 depend on the spectral sensitivities of the detector, the reference surfaces, and the illuminants, all of which are known for a reference image. The digital imaging system 200 can perform illumination detection training as part of calibration of the digital imaging system 200 without assuming either device linearity or spectral basis.

Figure 4:
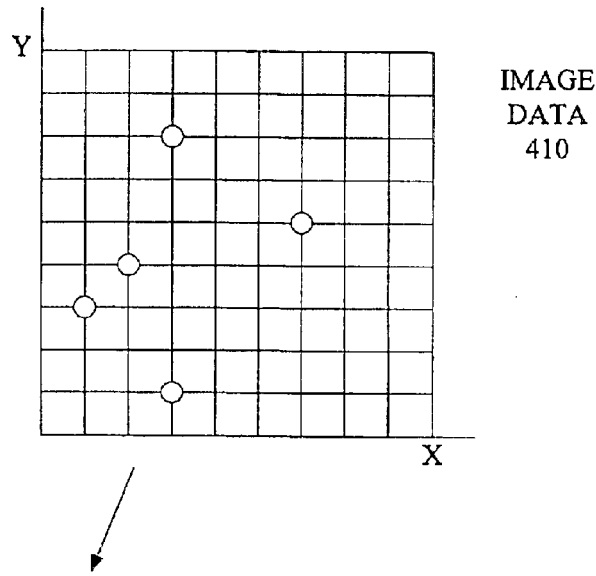
FIG. 4 is a schematic diagram that illustrates a result of vectorization of an acquired digital image.

After generating the correlation matrix memory 202, the digital imaging system 200 can plot image data in the same chromaticity space with a list of chromaticities created in vector form. Referring to FIG. 4, a schematic diagram illustrates a result of vectorization of an acquired digital image 410.

The image acquisition unit 210 such as a camera, scanner, or the like generates a digital image picture by converting RGB color data to chromaticities and creating an image vector 412 corresponding to the values existing in the scene. The image vector is similar to the columns in the correlation matrix but contains "1" values in the positions of chromaticities that appear in the image and contains "0" values for chromaticities that do not appear in the image.

The illuminant estimator 212 applies the correlation matrix stored in the correlation matrix memory 202 to an image vector formed by the image acquisition unit 210. The illuminant estimator 212 multiplies the image vector by each column in the correlation matrix to create a new matrix. In the new matrix, every row that represents a chromaticity that did not exist in the picture image is assigned a value of "0" and the rows representing chromaticities that did exist in the picture image are assigned to either "0" or "1". In this manner, the rows are either inactivated or allowed to be activated, as in the correlation matrix, depending on the existence of the color in the picture image. The illuminant estimator 212 multiplies the image vector v with each column in the correlation matrix M to produce a sum vector s according to equation (1):

$$S = v(t) \cdot M$$

where v(t) is the transpose of v.

In computation of the sum vector, rows are activated or deactivated depending upon whether a particular color is present in the image. Accordingly, multiplication of the image vector by rows in the correlation matrix activates rows that exist in the image and deactivate rows corresponding to non-image chromaticities. The sum vector is a cumulative correlation of values that represents the number of image chromaticities that are consistent with a particular illuminant. Specifically, the first entry of the sum vector specifies the number of input colors that are consistent with a first illuminant. The second entry of the sum vector specifies the number of input colors that are consistent with a second illuminant, in sequence for all illuminants. The entry with the largest number of consistent input numbers designates the appropriate illuminant.

Summing of the columns to form the sum vector results in a vector representing likelihood that each reference source is an illuminant of the scene. Values in the sum vector can be plotted on a density plot in a chromaticity space in which each value is plotted at the chromaticity of the illumination for that particular column. Statistical methods can be used on the plot to estimate the likely illumination of the scene.

The color correction unit 214 performs a threshold operation to convert the sum vector to a binary vector. In one example, a threshold can be selected that is equal to the number of input color, typically producing a result that only a single element of a binary vector is selected, corresponding to an illuminant that is consistent with all input colors. In other examples, a threshold that is less than the total number of input colors can be selected since aperture colors are not generally consistent with other image colors. The binary vector designates the illuminant that is most consistent with the input colors.

The correlation matrix M has elements set to "1" and can be analyzed as a special case of the Bayesian statistical model in which all colors under a particular illuminant, as well as all illuminants, are equally likely. An element in the correlation matrix is set to "1" if the image chromaticity of the row of the element is consistent with the illuminant of the column of the element.

Information, such as image database information, can be used to determine the probability that a chromaticity for a particular row occurs under the illuminant of a particular column. The information may be determined experimentally or from a theoretically determined distribution. Baye's rule permits calculation of the probability of an illuminant at a column given the fact that a chromaticity appears in an image. Assuming independence of surface reflectances that could appear in a scene, the probability of an illuminant j given image chromaticities I and a second image chromaticity k, is proportional to p(j|I) p(j|k). Equation p(j|I)p(j|k) can be written as log(p(j|I))+log(p(j|k)).

By initializing the position i,j in the correlation matrix to the value log(p(j|I)), the correlation matrix can be used to determine the most probable estimate of white. The maximum value sum vector corresponds to the most likely ruminant.

Figure 5:
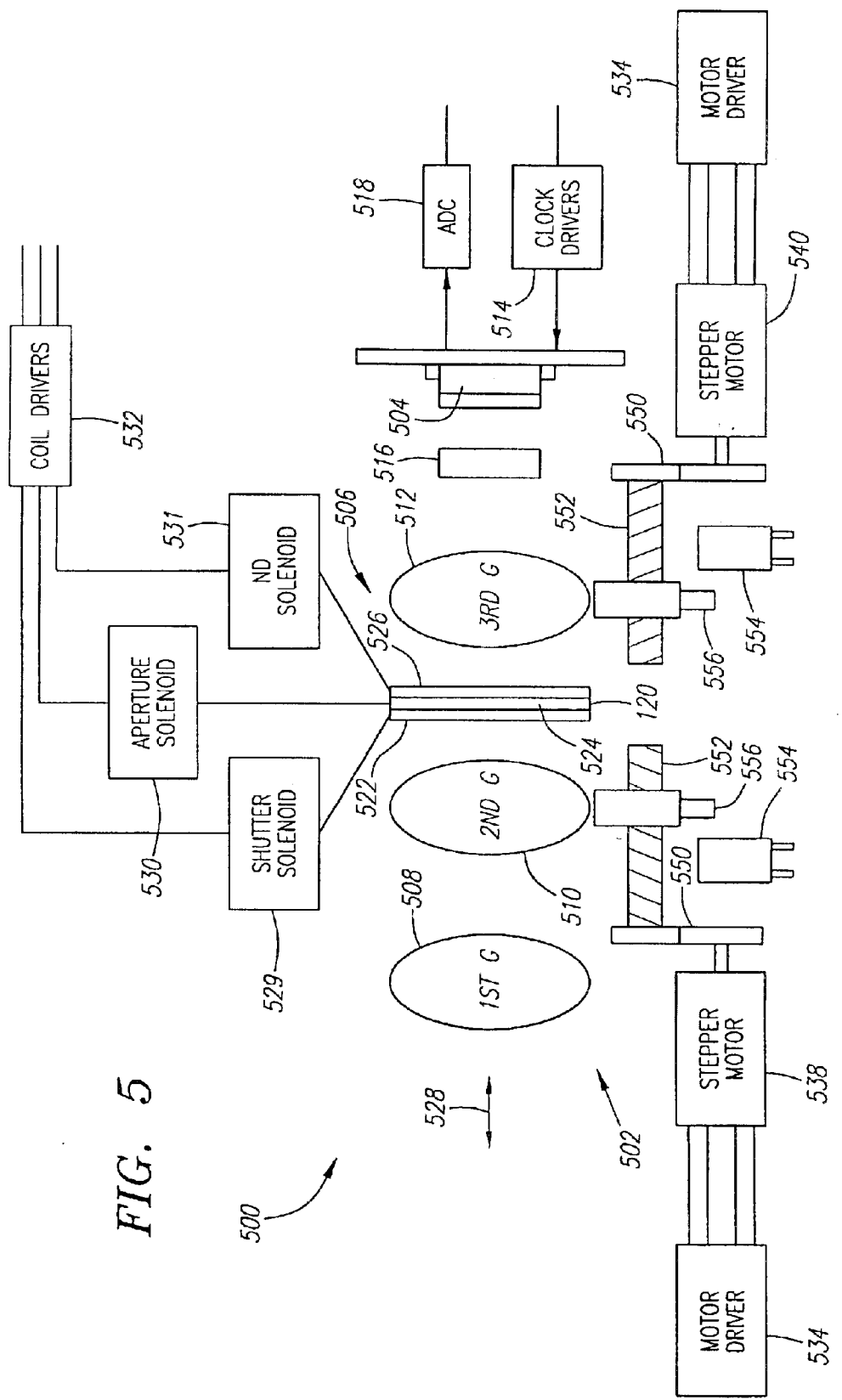
FIG. 5 is a schematic block diagram that illustrates an example of an image acquisition unit, an electronic imaging device that is suitable for supplying image data to the digital imaging system described in FIG. 1.

Referring to FIG. 5, a schematic block diagram illustrates an electronic camera 502 that is suitable for usage as an image acquisition unit 210. A sensor such as a charge-coupled device (CCD) photo sensor 504 that detects light passing through a lens system 506 to form an image. The alternative illustrative zoom and focus control system 500 has a lens system 506 that also includes a plurality of lens groups, each of which includes one or more lenses. The present example also has three lens groups, first lens group 508, second lens group 510, and third lens group 512. The first lens group 508 is a fixed-objective lens. The second lens group 510 is a moving group lens that contains an aperture stop (not shown). The second lens group 510 moves in conjunction with the third lens group 512 to cause magnification to change when the lens system 506 moves. The second lens group 510 moves in a nonlinear manner to hold the image plane in a relatively constant position as the lens system 506 is zoomed. The second lens group 510 is also moved to focus the lens system 506 after reaching a particular focal length. The third lens group 512 is also a moving group of lenses in the lens system 506. The third lens group 512 is also a moving lens group. The third lens group 512 moves in a linear manner to change the focal length of the camera as the lens zooms.

The CCD photo sensor 504 is a two-dimensional array of charge-coupled photo sensors that captures an image focused onto the photo sensors by the lens system 506. Individual photo sensor sites are pixels with an associated color such as red, green, or blue. CCD photo sensor 504 is exposed to light and charge integrates at the individual pixel site proportional to the number of photons received at the site. Clock drivers 514 are connected to the CCD photo sensor 504 and convey clock signals to control the read-out process of CCD photo sensor 504. Image processing hardware (not shown) generates the clock signals and sends the clock signals from the image processing hardware through the clock drivers 514 to the CCD photo sensor 504. The clock drivers 514 supply clock signals with high current and sufficient frequencies to drive highly capacitive CCD control lines.

A low pass filter 516 is connected to the CCD photo sensor 504 for anti-alias filtering to avoid optical moire effects resulting from the discrete CCD pixel structure. An example of the low pass filter 516 includes two birefringent quartz plates (not shown) and a quarter-wave plate (not shown). One birefringent quart plate produces filtering with respect to a horizontal direction of the CCD array. The other birefringent plate filters in a vertical direction of the CCD array. The quarter-wave plate functions is a depolarizer. The term low-pass filter indicates imaging of only a low spatial frequency image.

The CCD photo sensor 504 generates image signals and passes the signals through an analog to digital converter (ADC) 518 to the image processing hardware. Row-by-row pixel image data from the CCD photo sensor 504 are an analog voltage passed to the analog to digital converter 518. The analog to digital converter 518 amplifies and digitizes the image signal. The digitization process generates an N-bit digital word for each pixel. The analog to digital converter 518 clocks pixel data into the image processing hardware.

A shutter/aperture module 520 is interposed between the second lens group 508 and the third lens group 510. The shutter/aperture module 520 includes a shutter 522, apertures 524, and a neutral density filter 526. The shutter 522 is a blade switched into the optical path 528 of the lens system 506 to prevent light from reaching the CCD photo sensor 504. The shutter 522 blocks light at the end of an exposure time to complete image capture and when the camera is powered off to protect the CCD photo sensor 504 from receiving excessive light and damaging individual sensor elements.

The apertures 524 are multiple blades, each containing a hole. Different blades typically have different diameter holes. Different apertures can be switched into the optical path 528 to reduce the light transmitted through the lens system 506 to the CCD photo sensor 504. Different apertures 524 are used to control light exposure and focus depth of field. A typical still-image electronic camera has one or two aperture blades. In other designs, the aperture 524 may be composed of a diaphragm with continuously variable aperture hole sizes to supply a greater number of selectable apertures.

The neutral density filter 526 is an additional blade that can be switched into the optical path 528. The neutral density filter 526 also reduces the light passed through the lens system 506 to the CCD photo sensor 504. The aperture 524 and the neutral density filter 526 function similarly, but differ in that the neutral density filter 526 can be used to reduce the amount of light passing through the lens system 506 without affecting the focus depth of field. In contrast, usage of an aperture to reduce light to the CCD photo sensor 504 changes the depth of focus. The neutral density filter 526 can be used in conjunction with the apertures 524 to further reduce the level of light passing to the CCD photo sensor 504.

The shutter/aperture module 520 is controlled by signals passed from a camera control element (not shown) via solenoids 530. Individual blades of the shutter 522, the apertures 524, and the neutral density filter 526 are actuated in and out of the lens optical path 528 by a plurality of solenoids including a shutter solenoid 529, an aperture solenoid 530, and a neutral density filter solenoid 535. The solenoids are driven by coil drivers 532 which supply voltage and current for actuating the blades into position in a timely manner. The coil drivers 532 are controlled by signals from a processor (not shown) such as a central processing unit (CPU), a microcontroller, or control logic. The camera control element may be software or firmware that executes on the processor.

The processor determines relative positioning of the second lens group 510, and the third lens group 512, thus controlling zoom and focus functionality. The processor executes application programs that supply control information to a motor driver 534, an executing program code supplying control signals to a first stepper motor 538 and a second stepper motor 540. The stepper motors 538 and 540 physically control the position of the second lens group 510 and the third lens group 512, respectively.

In the illustrative electronic camera 502, the motor driver 534 sends signals to the stepper motor 538 that is connected to the second lens group 510 by gear reduction 550 and a lead screw 552. Similarly, the motor driver 534 sends signals to the stepper motor 538 that is connected to the third lens group 512 also by gear reduction 550 and a lead screw 552. The stepper motors 538 and 540 receive signals from the processor via the motor driver 534 that determine the position and motion of the second lens group 510 and the third lens group 512. In alternative systems, other types of motors and drive mechanisms can be used to controls lens position adjustment of the second and third lens groups 510 and 512. Photo sensors 554 are connected to the motor and drive mechanism for the second and third lens groups 510 and 512 to monitor positioning of the lens groups 510 and 512. The processor determines the initial positions of the second and third lens groups 510 and 512 by moving the lens groups toward the photo sensors 554 and detecting when flag 556 mounted on the second and third lens groups 510 and 512 reaches the photo sensors 554. The position at which the photo sensors 554 detect the flags is a home position. The processor measures the positions of the second and third lens groups 510 and 512 relative to the home position. The processor tracks the number of steps the stepper motors 538 and 540 execute in all moves relative to the home position.

The motor drivers 534 supply voltage and current to the stepper motors 538 and 540, thus determining the position and motion of the second lens group 510 and the third lens group 512. The motor drivers 534 are controlled by signals from the processor.

Figure 6:
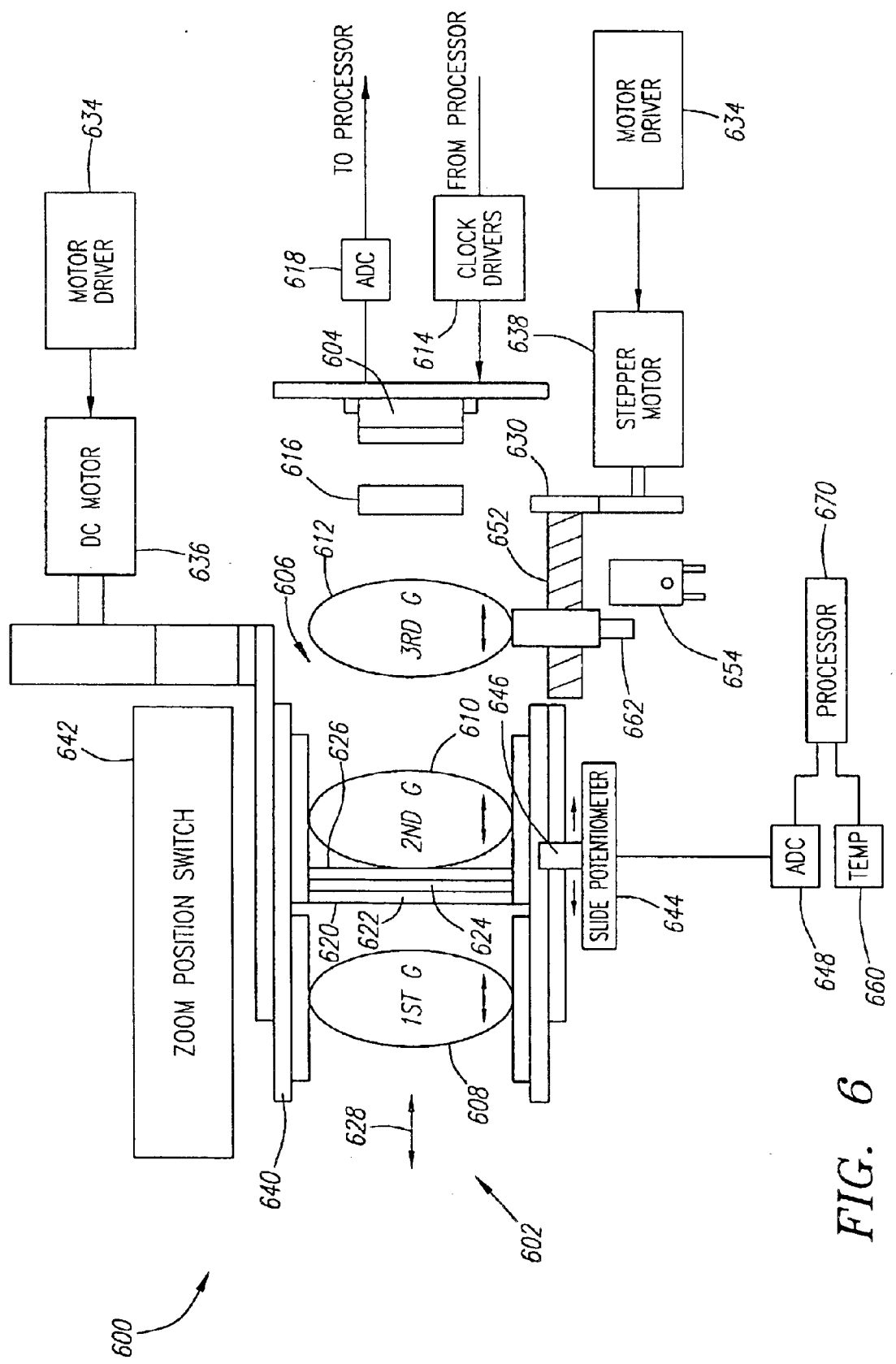
FIG. 6 is a schematic block diagram that illustrates another example of an electronic acquisition unit, an electronic camera also suitable for supplying image data to the digital imaging system described in FIG. 1.

Referring to FIG. 6, a schematic block diagram illustrates another electronic camera 602 that is suitable for usage as an image acquisition unit 210. An image is detected at a sensor, for example a charge-coupled device (CCD) photo sensor 604 that detects light passing through a lens system 606. In the illustrative zoom and focus control system 600, the lens system 606 includes a plurality of lens groups, each of which includes one or more lenses. One example has three lens groups, first lens group 608, second lens group 610, and third lens group 612. The second lens group 610, termed a variator, changes the effective focal length of the lens and moves in a linear manner. The first lens group 608 moves in a nonlinear manner relative to the linear motion of the second lens group 610 and functions as a compensator. The first lens group 608 functions to hold the image plane relatively constant as the lens is zoomed over the range of focal lengths of the lens system 606. The third lens group 612 is a positive is a positive element that is moved to focus the lens system 606.

The CCD photo sensor 604 is a two-dimensional array of charge-coupled photo sensors used to capture the image that is focused onto the photo sensors by the lens system 606. The individual photo sensor sites are defined as pixels and have an associated color such as red, green, or blue. As the CCD photo sensor 604 is exposed to light, charge integrates at the individual pixel site proportional to the number of photons received at the site. Clock drivers 614 are connected to the CCD photo sensor 604 and propagate clock signals that are used to control the read-out process of the CCD photo sensor 604. Image processing hardware (not shown) generates the clock signals. The clock signals propagate from the image processing hardware through the clock drivers 614 to the CCD photo sensor 604. The clock drivers 614 supply clock signals with high levels of current at sufficient frequencies to drive highly capacitive CCD control lines.

A low pass filter 616 is connected to the CCD photo sensor 604 for usage as an anti-aliasing filter to avoid optical moire effects that occur due to the discrete nature of the CCD pixel structure. One suitable example of the low pass filter 616 includes two birefringent quartz plates (not shown) and a quarter-wave plate (not shown). One of the birefringent quart plates produces filtering with respect to a horizontal direction of the CCD array. The second birefringent plate produces filtering in a vertical direction of the CCD array, 90° shifted from the horizontal direction. The quarter-wave plate functions as a depolarizer. The term low-pass filter indicates imaging of only a low spatial frequency image.

The CCD photo sensor 604 generates image signals that are passed through an analog to digital converter (ADC) 618 to the image processing hardware. Row-by-row pixel image data is read from the CCD photo sensor 604 as an analog voltage and is passed to the analog to digital converter 618. The analog to digital converter 618 amplifies and digitizes the image signal. The digitization process generates an N-bit digital word for each pixel. The analog to digital converter 618 clocks the digital words for the pixels into the image processing hardware.

A shutter/aperture module 620 is interposed between the first lens group 608 and the second lens group 610. The shutter/aperture module 620 includes a shutter 622, apertures 624, and a neutral density filter 626. The shutter 622 is a blade that is switched into the optical path 628 of the lens system 606 to prevent light from reaching the CCD photo sensor 604. The shutter 622 typically is controlled to block the light at the end of an exposure time to complete image capture. The shutter 622 is also closed when the camera is powered off to protect the CCD photo sensor 604 from receiving excessive light, potentially causing damage to the individual sensor elements.

The apertures 624 are multiple blades containing different diameter holes. An aperture blade can be switched into the optical path 628 to reduce the amount of light transmitted through the lens system 606 to the CCD photo sensor 604. Different apertures 624 are used to control light exposure and to control the focus depth of field. A typical electronic camera that is used for still image reception has one or two aperture blades. Alternatively, the aperture 624 may be composed of a diaphragm with continuously variable aperture hole sizes to supply a greater number of selectable apertures.

The neutral density filter 626 is an additional blade that can be switched into the optical path 628. The neutral density filter 626 also reduces the amount of light that is transmitted through the lens system 606 to the CCD photo sensor 604. Although an aperture 624 and the neutral density filter 626 are similar in function, the neutral density filter 626 can be used to reduce the amount of light passing through the lens system 606 without affecting the focus depth of field. Usage of an aperture to reduce light to the CCD photo sensor 604 always affects the depth of focus. The neutral density filter 626 can be used in conjunction with the apertures 624 to further reduce the level of light passing to the CCD photo sensor 604.

The shutter/aperture module 620 is controlled by signals passed from a camera control block (not shown) via solenoids (not shown). Individual blades of the shutter 622, the apertures 624, and the neutral density filter 626 are actuated in and out of the lens optical path 628 by a solenoid. The individual solenoids are driven by a solenoid driver (not shown) which supplies the voltage and current for actuating the blades into position in a timely manner. The solenoid drivers are controlled by signals from a processor 670 such as a central processing unit (CPU), a microcontroller, or control logic. The camera control block may be software or firmware that executes on the processor 670.

The processor 670 determines relative positioning of the first lens group 608, the second lens group 610, and the third lens group 612, thus controlling zoom and focus functionality. The processor 670 executes application programs that supply control information to a motor driver 634, an executing program code supplying control signals to a DC motor 636 and a stepper motor 638. The DC motor 636 physically controls the position of the first lens group 608 and the second lens group 610 of the lens system 606. The stepper motor 638 physically controls the position of the third lens group 612. The first lens group 608 and the second lens group 610 are held by a lens barrel 640. DC motor 636 is connected to the lens barrel 640 and drives the rotation of the lens barrel 640 via a set of gears (not shown) between the lens barrel 640 and the DC motor 636. As the lens barrel 640 rotates, the positions of the first lens group 608 and the second lens group 610 are adjusted through the operation of cam slots (not shown) inside the lens barrel 640. A lens cam switch 642 is mounted on the lens barrel 640 and sends signal transitions to the processor 670 as the lens barrel 640 rotates through a plurality of zoom positions. In one example, the electronic camera 602 has three zoom positions of wide, tele, and retract. A slider potentiometer 644 is connected to the lens barrel 640. As the lens barrel 640 rotates between the wide and tele zoom positions, the slider potentiometer 644 produces a fine zoom position information. A cam slot 646 in the lens barrel 640 drives the slider potentiometer 644 depending on the position of the wide and tele zoom position. The processor 670 determines the fine zoom position by reading the voltage obtained from the center tap of the slider potentiometer 644 via an analog-to-digital converter (ADC) 648. Fine zoom position values produced by the slider potentiometer 644 are calibrated by recording the slider potentiometer values when the lens cam switch 642 is positioned at the tele and wide positions.

In the illustrative electronic camera 602, the motor driver 634 sends signals to the stepper motor 638 that is connected to the third lens group 612 by gear reduction 650 and a lead screw 652. The stepper motor 638 receives signals from the processor 670 via the motor driver 634 that determine the position and motion of the third lens group 612. In alternative systems, other types of motors and drive mechanisms can be used to controls lens position adjustment of the third lens group 612. Photo sensors 654 are connected to the motor and drive mechanism for the third lens group 612 to monitor positioning of the third lens group 612. The processor 670 determines the initial position of the third lens group 612 by moving the lens group toward the photo sensor 654 and detecting when flag 662 mounted on the third lens group 612 reaches the photo sensor 654. The position at which the photo sensor 654 detects the flag is a home position. The processor 670 measures the position of the third lens group 612 relative to the home position. The processor 670 tracks the number of steps the stepper motor 638 executes in all moves relative to the home position.

The motor driver 634 supplies voltage and current to the DC motor 636 and the stepper motor 638, thus determining the position and motion of the first lens group 608 and second lens group 610, and the third lens group 612. The motor driver 634 is controlled by signals from the processor 670.

A temperature sensor 660 inside the electronic camera 602 measures temperature and is connected to the processor 670. The processor 670 includes a processing logic that is capable of adjusting a starting position of the lenses to adjust focus for temperature differences.

In accordance with another aspect of the invention, the digital imaging system 200 can access a database such as the scene attributes 118 and viewing condition tags 119 database described with reference to FIG. 1 that is capable of supplying actual image data including illuminants, chromaticities, colors, and the like. The scene attributes 118 and viewing condition tags 119 database further includes information relating to the actual image data including tags that identify the image acquisition device that acquires a particular image, and information relating to manufacturer, model and version of the image acquisition device, and image acquisition devices settings at the time of acquisition. The digital imaging system 200 uses the information for design and improvement of image acquisition devices such as digital cameras and scanners. The database includes tags such as manufacturer and model tags to screen the digital images stored in the database according to manufacturer and model. The database also stores additional private image tag information according to tags that are generated by the image acquisition devices to derive additional information when images created by the devices are acquired and stored in the database. Examples of tag information include identification of manufacturer and model. Other tag information relates to imaging characteristics such as focal length, shutter speed, aperture, and the like.

The digital imaging system 200 can use the tag information to perform statistical analysis on the usage of the image acquisition unit 110. For example, tags can be used to signify whether a camera is more often used to take photographs in a landscape configuration or a portrait configuration. A statistical analysis can be performed to determine whether a preponderance of images is taken in a particular configuration. As a result of the statistical analysis, camera designers may arrange imaging components or photodetectors in a particular manner to exploit information relating to the most common usage of the camera.

The digital imaging system 100 can use the database to perform various types of statistical analysis. In one aspect the digital imaging system 100 can perform an analysis that determines the type of images that are acquired, classifying the images according to subject matter, illuminant, color content, scene, whether images are more commonly acquired of people or natural scenes, action images or posed images, depth of field of the image content of particular interest, and many other considerations.

The digital imaging system 100 can analyze the database to determine percentages of particular image characteristics. For example, the system may perform illuminant analysis to determine the percentage of images taken with outdoor light, fluorescent lighting, halogen lighting, other indoor lighting, night lighting, flash pictures, and combinations of lighting. The various types of images may be analyzed to improve illuminant detection algorithms.

Similarly, the digital imaging system 100 can analyze images in the database to improve other algorithms and techniques including geometric compression, auto-sharpening, red-eye removal, and the like. The digital imaging system 100 can also use the database to develop artificial intelligence analysis functions such as scene recognition, face recognition, and the like.

The digital imaging system 100 can use the tagged information in the manner of a flight recorder to determine common methods of transferring images such as facsimile transfer, copying, printing, and the like.

Tags can be used to collect information concerning the manner of usage of the image acquisition unit 110, particularly concerning the usage of the image acquisition unit as an entry node to a network. For example, images may be transferred to a network using a camera as an input node, or images may be transferred through a personal computer, a photography shop, a laboratory, or the like. Cameras may be improved to simplify or otherwise facilitate the transfer of images to the internet.

Various features of the image acquisition unit 110 may be tagged to determine the usage of particular device features. Users may commonly and frequently use particular camera features and may avoid usage of other features. The digital imaging system 100 can analyze usage information to determine features that are not used sufficiently to justify the cost of including the feature in the imaging device. Image device developers can use the statistical information to eliminate or modify the infrequently used features based on the information.

While the invention has been described with reference to various embodiments, it will be understood that these embodiments are illustrative and that the scope of the invention is not limited to them. Many variations, modifications, additions and improvements of the embodiments described are possible. For example, those having ordinary skill in the art will readily implement the steps necessary to provide the structures and methods disclosed herein, and will understand that the process parameters, materials, and dimensions are given by way of example only and can be varied to achieve the desired structure as well as modifications which are within the scope of the invention. Variations and modifications of the embodiments disclosed herein may be made based on the description set forth herein, without departing from the scope and spirit of the invention as set forth in the following claims. For example, one or ordinary skill in the art could similarly apply the first and second quality-of-service techniques to the other interconnect structures described herein.

In the claims, unless otherwise indicated the article "a" is to refer to "one or more than one".

What is claimed is:

1. A digital imaging system comprising:
   an image acquisition unit that is capable of acquiring digital images;
   a correlation matrix memory coupled to the image acquisition unit;
   a color image database storing multiple images from actual image data; and
   a processor coupled to the image acquisition unit and coupled to the correlation matrix memory, the processor comprising an image processing process that is capable of detecting color and illuminants of the acquired digital images based on color and illuminants of the multiple images from actual image data stored in the color image database.

2. A digital imaging system according to claim 1 further comprising:
   the processor that executes an illuminant detection training algorithm that bases control of illumination and color on a database storing actual illuminants, scenes, and subjects from representative image acquisition devices such as digital cameras and scanners.

3. A digital imaging system according to claim 1 further comprising:
   a correlation matrix contained within the correlation matrix memory, the correlation matrix being a two-dimensional matrix comprising a first dimension corresponding to a set of candidate illuminants and a second dimension corresponding to chromaticities, the illuminants and the chromaticities being selected based on data in the database storing actual illuminants, scenes, and subjects from representative image acquisition devices such as digital cameras and scanners.

4. A digital imaging system according to claim 1 further comprising:
   a correlation matrix contained within the correlation matrix memory, the correlation matrix being a two-dimensional matrix comprising a first dimension corresponding to a set of candidate illuminants and a second dimension corresponding to chromaticities, the illuminants and chromaticities being determined for a variety of illuminants, scenes, and subjects that are expected to be of interest to users of a particular camera or group of cameras.

5. A digital imaging system according to claim 1 wherein:
   the color image database stores information relating to actual image data including tags identifying an image acquisition device that acquires a particular image, information identifying characteristics of the image acquisition device, and image acquisition device settings at image acquisition.

6. A digital imaging system comprising:
   an image acquisition unit that is capable of acquiring digital images;
   a correlation matrix memory coupled to the image acquisition unit;
   a processor coupled to the image acquisition unit and coupled to the correlation matrix memory, the processor comprising an image processing process that is capable of detecting color and illuminants of the acquired digital images based on color and illuminants of multiple images from actual image data stored in a color image database;
   an image vector process operational in the image processing process and capable of forming an image vector based on chromaticities associated with the acquired image; and a chromaticity assignment process of the image vector process that is capable of assigning positions of the image vector according to chromaticity, further comprising:
      a data conversion process that converts RGB data from the acquired image to chromaticities selected based on color and illuminants of multiple images stored in the color image database;
      a position selection process that sets a position of the image vector to a first binary value if chromaticity corresponding to the position appears in the acquired image; and
      a position deselection process that resets a position of the image vector to a second binary value if chromaticity corresponding to the position fails to appear in the acquired image.

7. A digital imaging system according to claim 6 further comprising:
   a matrix multiplication process operational in the image processing process and capable of multiplying the image vector by the correlation matrix to form a resulting vector; and
   an illuminant selection process operational in the image processing process and capable of selecting at least one candidate illuminant from the net of candidate illuminants to be the associated illuminant in the acquired digital image based on the resulting vector, the set of candidate illuminants being selected based on color and illuminants of multiple images stored in the color image database.

8. A digital imaging system comprising:
   an image acquisition unit that is capable of acquiring digital images;
   a correlation matrix memory coupled to the image acquisition unit;
   a processor coupled to the image acquisition unit and coupled to the correlation matrix memory, the processor comprising an image processing process that is capable of detecting color and illuminants of the acquired digital images based on color and illuminants of multiple images from actual image data stored in a color image database; and
   a correlation matrix contained within the correlation matrix memory, the correlation matrix being a two-dimensional matrix comprising a first dimension corresponding to a set of candidate illuminants and a second dimension corresponding to chromaticities, the illuminants and chromaticities being determined based on actual image data including tags that identify the image acquisition device that acquires a particular image, and information concerning manufacturer, model and version of the image acquisition device, and image acquisition devices settings at the time of acquisition.

9. A digital imaging system comprising:
   an image acquisition unit that is capable of acquiring digital images;
   a correlation matrix memory coupled to the image acquisition unit;
   a processor coupled to the image acquisition unit and coupled to the correlation matrix memory, the processor comprising an image processing process that is capable of detecting color and illuminants of the acquired digital images based on color and illuminants of multiple images from actual image data stored in a color image database; and
   a correlation matrix contained within the correlation matrix memory, the correlation matrix being a two-dimensional matrix comprising a first dimension corresponding to a set of candidate illuminants and a second dimension corresponding to chromaticities, the illuminants and chromaticities being determined based on information relating to actual image data including tags that identify the image acquisition device that acquires a particular image, and information concerning the manufacturer, model and version of the image acquisition device, and image acquisition devices settings at the time of acquisition.

10. A digital imaging system comprising:
    an image acquisition unit that is capable of acquiring digital images;
    a correlation matrix memory coupled to the image acquisition unit;
    a processor coupled to the image acquisition unit and coupled to the correlation matrix memory, the processor comprising an image processing process that is capable of detecting color and illuminants of the acquired digital images based on color and illuminants of multiple images from actual image data stored in a color image database; and
    a correlation matrix contained within the correlation matrix memory, the correlation matrix being a two-dimensional matrix comprising a first dimension corresponding to a set of candidate illuminants and a second dimension corresponding to chromaticities, the illuminants and chromaticities being determined based on information relating to tags such as manufacturer and model tags to screen the digital images stored in the database according to manufacturer and model.

11. A digital imaging system comprising:
an image acquisition unit that is capable of acquiring digital images;
a correlation matrix memory coupled to the image acquisition unit;
a processor coupled to the image acquisition unit and coupled to the correlation matrix memory, the processor comprising an image processing process that is capable of detecting color and illuminants of the acquired digital images based on color and illuminants of multiple images from actual image data stored in a color image database; and
a correlation matrix contained within the correlation matrix memory, the correlation matrix being a two-dimensional matrix comprising a first dimension corresponding to a set of candidate illuminants and a second dimension corresponding to chromaticities, the illuminants and chromaticities being determined based on information relating to private image tag information including manufacturer and model information tags, and image data tags including focal length, shutter speed, and aperture.

12. A method of operating a digital imaging system comprising:
collecting actual image data;
storing a color image database of multiple images from the collected actual image data;
acquiring digital images;
forming a correlation matrix memory including illuminant and chromaticity data, the correlation matrix being a two-dimensional matrix comprising a first dimension corresponding to a set of candidate illuminants and a second dimension corresponding to chromaticities; and detecting a color and illuminants of the acquired digital images based on color and illuminants of multiple images from actual image data stored in a color image database.

13. A method according to claim 12 further comprising:
communicating acquired digital image data and illuminant and chromaticity data between an image acquisition device and the color image database.

14. A method according to claim 12 further comprising:
basing control of illumination and color on a database storing actual illuminants, scenes, and subjects from representative image acquisition devices such as digital cameras and scanners.

15. A method according to claim 12 further comprising:
determining the illuminants and chromaticities for a variety of illuminants, scenes, and subjects that are expected to be of interest to users of a particular camera or group of cameras.

16. A method of operating a digital imagine system comprising:
acquiring digital images; forming a correlation matrix memory including illuminant and chromaticity data, the correlation matrix being a two-dimensional matrix comprising a first dimension corresponding to a set of candidate illuminants and a second dimension corresponding to chromaticities; and detecting a color and illuminants of the acquired digital images based on color and illuminants of multiple images from actual image data stored in a color image database;
forming an image vector based on chromaticities associated with the acquired image; and
assigning positions of the image vector according to chromaticity, further comprising:
converting RGB data from the acquired image to chromaticities selected based on color and illuminants of multiple images stored in the color image database;
selecting a position of the image vector to a first binary value if chromaticity corresponding to the position appears in the acquired image; and
deselecting a position of the image vector to a second binary value if chromaticity corresponding to the position fails to appear in the acquired image.

17. A method to according to claim 16 further comprising:
selecting at least one candidate illuminant from the set of candidate illuminants to be the associated illuminant in the acquired digital image based on the resulting vector, selecting the set of candidate illuminants based on color and illuminants of multiple images stored in the color image database.

18. A method of operating a digital imaging system comprising:
acquiring digital images; forming a correlation matrix memory including illuminant and chromaticity data, the correlation matrix being a two-dimensional matrix comprising a first dimension corresponding to a set of candidate illuminants and a second dimension corresponding to chromaticities; and detecting a color and illuminants of the acquired digital images based on color and illuminants of multiple images from actual image data stored in a color image database; and
determining the illuminants and chromaticities based on actual image data including tags that identify the image acquisition device that acquires a particular image, and information concerning manufacturer, model and version of the image acquisition device, and image acquisition devices settings at the time of acquisition.

19. A method of operating a digital imaging system comprising:
acquiring digital images; forming a correlation matrix memory including illuminant and chromaticity data, the correlation matrix being a two-dimensional matrix comprising a first dimension corresponding to a set of candidate illuminants and a second dimension corresponding to chromaticities; and detecting a color and illuminants of the acquired digital images based on color and illuminants of multiple images from actual image data stored in a color image database; and
determining the illuminants and chromaticities based on information relating to actual image data including tags that identify the image acquisition device that acquires a particular image, and information concerning the manufacturer, model and version of the image acquisition device, and image acquisition devices settings at the time of acquisition comprising focal length, shutter speed, and aperture.

20. A digital imaging system comprising:
means for storing multiple images from actual image data in a color image database;
means for acquiring digital images;
means for forming a correlation matrix memory including illuminant and chromaticity data, the correlation matrix being a two-dimensional matrix comprising a first dimension corresponding to a set of candidate illuminants and a second dimension corresponding to chromaticities; and
means for detecting a color and illuminants of the acquired digital images based on color and illuminants of multiple images stored in a color image database.

21. A digital imaging system according to claim 20 further comprising:
means for basing control of illumination and color on a database storing actual illuminants, scenes, and subjects from representative image acquisition devices such as digital cameras and scanners.

* * * * *

UNITED STATES PATENT AND TRADEMARK OFFICE
CERTIFICATE OF CORRECTION

| | |
|---|---|
| PATENT NO. | : 6,873,727 B2 |
| APPLICATION NO. | : 09/911280 |
| DATED | : March 29, 2005 |
| INVENTOR(S) | : Patricia D. Lopez et al. |

Page 1 of 1

It is certified that error appears in the above-identified patent and that said Letters Patent is hereby corrected as shown below:

IN THE SPECIFICATION

Column 8, line 14, delete "ruminant" and insert therefor --illuminant--

IN THE CLAIMS

Claim 7, Column 15, line 62, delete "net" and insert therefor --set--

Signed and Sealed this

Twenty-sixth Day of June, 2007

JON W. DUDAS
*Director of the United States Patent and Trademark Office*